Jan. 7, 1964     M. DE GOOD ETAL     3,116,818
CASE STOP FOR A CONVEYOR

Filed March 24, 1961     2 Sheets-Sheet 1

INVENTORS
MAYNARD DE GOOD
BY CLYDE BOWMAN

Price & Heneveld
ATTORNEYS

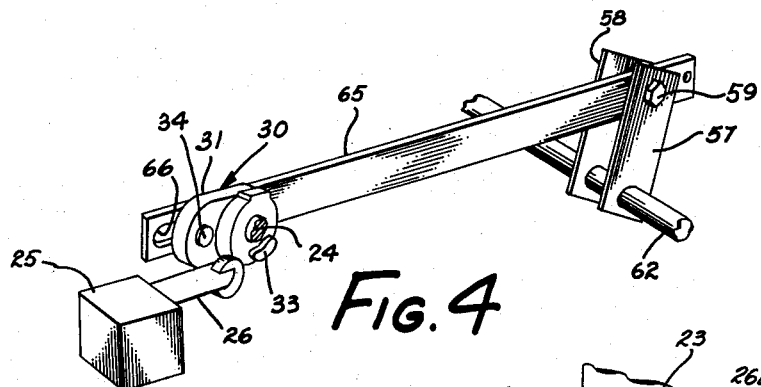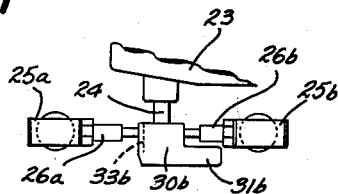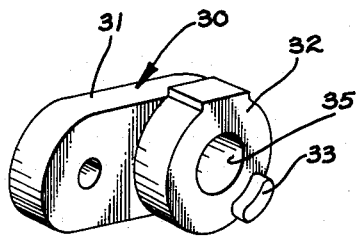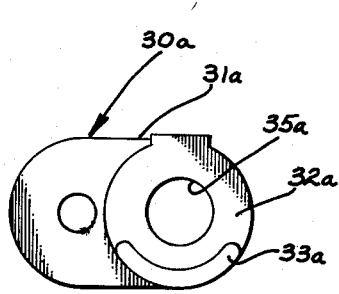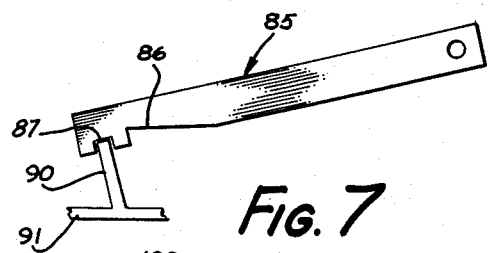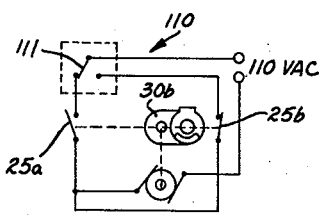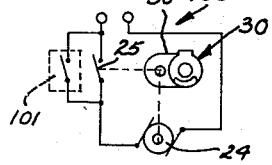

United States Patent Office 3,116,818
Patented Jan. 7, 1964

3,116,818
CASE STOP FOR A CONVEYOR
Maynard De Good and Clyde Bowman, Grand Rapids, Mich., assignors to The Rapids-Standard Company, Inc., Grand Rapids, Mich., a corporation of Michigan
Filed Mar. 24, 1961, Ser. No. 98,143
12 Claims. (Cl. 193—32)

This invention relates to a case stop, and more particularly to a case stop utilized to control movement of a case on a conveyor.

One of the major disadvantages of the present type of case stops utilized to control the movement of cases on a conveyor is that the release mechanism is not disassociated from the motor which drives it. Thus, if the container for some reason remains in the path of the release structure when it is returning to the container stopping position the container may become punctured by the release structure or dislodged from the conveyor. If heavy objects are being conveyed the engagement of the release structure with the container may result in overload of the motor which drives the release mechanism damaging the motor or resulting in breakage of the release structure.

The instant invention overcomes these problems by providing an arrangement whereby the motor drive is disassociated from the release structure when the release structure assumes the release position. Damage to a container on the conveyor cannot result since the motor will not return the release structure to a container stopping position. Since the motor is disassociated from the release structure it cannot become overloaded should it be energized when the release structure is retained in the released position by a misplaced case.

It is therefore an object of this invention to provide a case stop having mechanism which will disassociate the motor from the release structure when the release structure assumes the release position.

Yet another object of this invention is to provide a case stop which will positively hold down the release structure during periods of free flow of containers on a conveyor.

It is still another object of this invention to provide a case stop which has an extremely light force for returning the release structure to the container stopping position.

Yet another object of this invention is to provide a case stop having release structure which is prevented from rising with such force under a package that it punctures and breaks fragile articles traveling on the conveyor or dislodges these articles from the conveyor.

Another object of this invention is to provide a case stop having release structure which can be withdrawn from a container applying several hundred pounds of line pressure thereagainst by a motor of simple design and low horse power.

Still another object of this invention is to provide a case stop wherein the shock of articles engaging the release structure is not transferred to the motor.

Still another object of this invention is to provide a case stop which is constructed of a minimum number of component parts, is compact having a low silhouette providing a device which is easily adaptable to various types of conveyors.

These and other objects and advantages of this invention will become more apparent upon reading the specification in conjunction with the accompanying drawings.

In the drawings:

FIG. 4 is a perspective view of the actuator mechanism and the control means therefor;

FIG. 5 is a perspective view of the control member;

FIG. 6 is a side view of a modified form of a control member;

FIG. 7 is a side view of a modified form of the actuator mechanism and a latch for holding the release arms in the release position.

FIG. 8 is a perspective view of another modified form of control member;

FIG. 9 is a plan view showing the control member of FIG. 8 utilized with two control switches;

FIG. 10 is a diagrammatic electrical control circuit;

FIG. 11 is a modified diagrammatic electrical control circuit; and

Figure 1:
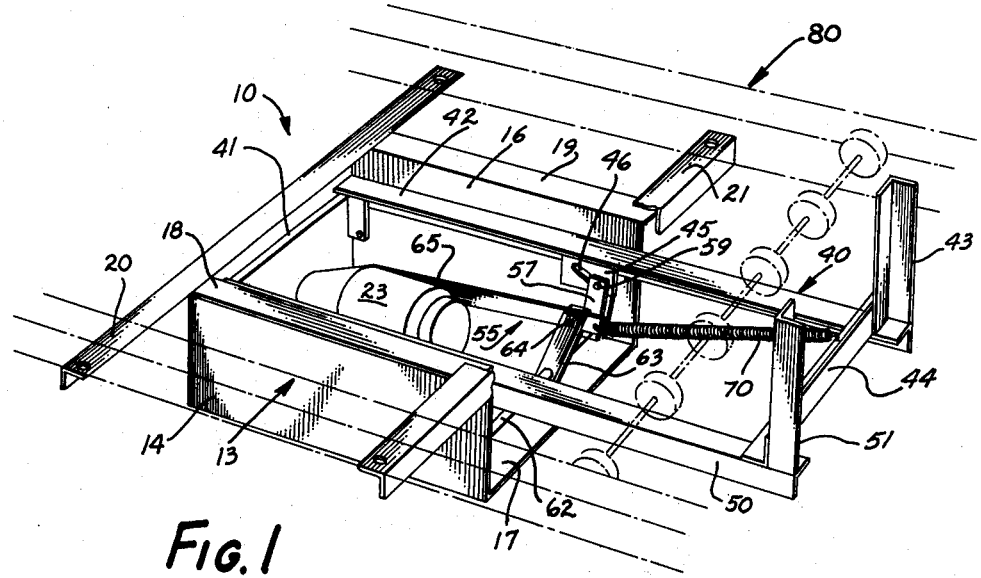
FIG. 1 is a perspective view of the case stop with a portion of the mounting bracket cutaway to expose the release arm actuator mechanism.

Basically, this invention relates to a case stop which has case release structure that can be pivoted into and out of the path of a case traveling on a conveyor. The case release controls the flow of cases on the conveyor with which it is associated by stopping or releasing the cases.

The case stop has a pair of spaced release arms which are pivotally connected to support means affixed to a conveyor by conventional fastening means. Case stop fingers are ssecured to the release arms and project upwardly therefrom through the conveyor mechanism. Power means is secured to the support. The output of the power means is connected to actuator mechanism which is in turn connected to the release arms by appropriate mechanical linkage. Rotation of the motor results in the mechanical linkage pivoting the release arms and their fingers out of the path of travel of containers on the conveyor. The power means has a lost motion connection with the actuator means such that the motor becomes disassociated from the actuator means when the release structure assumes the released position. The interval during which the motor is energized is controlled by a control member and limit switch means. The release structure is returned to the case stopping position by resilient means which constantly urges the release arms to the stop position. A separate resilient member is connected to the actuator mechanism to assist in resetting this mechanism after the release structure has returned to the stop position.

A modified form of the invention provides control means which stops the power means after the release structure assumes the released position. With this embodiment of this invention the release structure is positively held in the release position by the power means.

Another modified form of the invention provides a latching arrangement whereby the actuator means is maintained in a given position after release of the release structure thereby positively locking the release structure in the released position.

The case stop assembly is designated generally as 10. The assembly includes a support frame 13, a motor or power means 23, a limit switch 25, a control member 30, release structure 40, actuator mechanism 55, and reset and return springs 70 and 77 respectively.

Referring now more specifically to the details of the invention, FIG. 1 best shows the support frame 13. The support frame 13 is an elongated generally U-shaped member having sides 14 and 16 connected to a bottom 17. The sides 14 and 16 have outwardly projecting flanges 18 and 19 to which mounting brackets 20 and 21 are secured. The mounting brackets 20 and 21 are transversely disposed at opposite ends of the support frame and project outwardly from either side of the support frame. These mounting brackets are utilized to secure the support frame to the underside of a conveyor such as 80.

A motor 23 (FIG. 3) is secured to the support frame bottom 17. The motor 23 has an output shaft 24 which is associated with the control member 30 now to be described.

The control member 30 (FIGS. 4 and 6) is a casting having a body portion 31 and an offset portion 32. A centrally disposed bore 35 extends transversely through the body and offset portion and receives the output shaft 24 of motor 23. The control member is secured to the shaft by a set screw or is keyed to the shaft in some other conventional manner. The offset portion of the control member is tapped and provided with a control pin 34 which projects transversely therefrom. The pin 34 engages actuator mechanism to be explained more fully hereinafter. The body 31 has a lobe 33 formed integral therewith and extending transversely therefrom. The lobe 33 shown in FIG. 5, is merely a small segment of an arc which is utilized to actuate the limit switch 25.

A modified form of control member is shown in FIG. 6 and is designated generally as 30a. The control member 30a has a body portion 31a and an offset portion 32a which is identical to the control member 30. It is provided with a bore 35a to receive the output shaft of motor 24. The lobe 33a of control member 30a differs from the lobe 33 of control member 30. The difference being that of size. The lobe 33a is of arcuate design extending about an arc of approximately 120°. This cam is utilized to stop the motor every half revolution as will be explained more fully hereinafter in the operation.

The control member 30 operates with an electrical circuit 100 shown in FIG. 10. The motor 23 is in series with the switch 25 which is normally closed and opened by control member 30. An external control which for purposes of illustration is a switch is parallel with the switch 25 and when closed energizes the motor 24.

FIG. 8 shows still another form of control member designated generally as 30b. It has a body portion 31b with an offset portion 32b. It is provided with a bore 35b which receives the motor shaft 24. The offset portion 32b has a recess 33b formed on the outer periphery thereof. The control member 30b is used in combination with control switches 25a and 25b (FIG. 9) which are located diametrically opposite each other on either side of offset portion 32b. The actuators 26a and 26b of control switches 25a and 25b respectively engage the offset portion 32b and are actuated when they come in contact with recess 33b.

The electrical circuit, shown diagrammatically in FIG. 11, which cooperates with the control arrangement of FIG. 8 is designated generally as 110. Normally closed switches 25a and 25b are placed in series with the motor 24 which is connected to one line of a source of electrical power. The switches 25a and 25b are opened by the control member 30b. The switches 25a and 25b are also in series with an external control which for illustration purposes is a double throw switch 111. The switch 111 is connected to the other line of the power source.

A pivot pin 41 (FIGS. 1, 2 and 3) extends between the port frame sides 14 and 16 and is journaled in apertures formed therein. Appropriate retainer means such as washers and cotter pins are provided on the ends of the pivot pin 41 to secure it in position on the support frame. The pivot pin 41 is journaled in the top rear corners of the sides 14 and 16 as best shown in FIG. 1.

A release arm 42 has one end thereof fixedly secured to the pivot pin 41 by means such as welding. The support arm 42 is an elongated member projecting a substantial distance beyond the support frame end opposite its point of connection with the pivot pin 41. It may take the design of an L-angle iron and is disposed adjacent the side 16. The release arm 42 is provided with a stop finger 43 which is disposed normal thereto and projects upwardly therefrom. The stop finger 43 is secured to the end of the release arm 42 opposite the end secured to the pivot pin 41. Disposed approximately centrally between the ends of the release arm 42 in a downwardly depending cam plate 45. The cam plate 45 is provided with an angularly disposed cam slot 46 which cooperates with a cam pin forming a part of the actuator mechanism 55 to be explained more fully hereinafter.

The release arm 50 is similar in design to the release arm 40 and has one end thereof secured to the pivot pin 41 adjacent the side 14. The release arm 50 is diametrically opposite the release arm 40. It has a stop finger 51 secured thereto which is diametrically opposite the stop finger 43 and cooperates therewith to stop articles traveling on the conveyor 80. The release arm 50 also has a downwardly depending cam plate 53 having a cam slot 54 which is disposed opposite the cam plate 45.

Figures 3, 12:
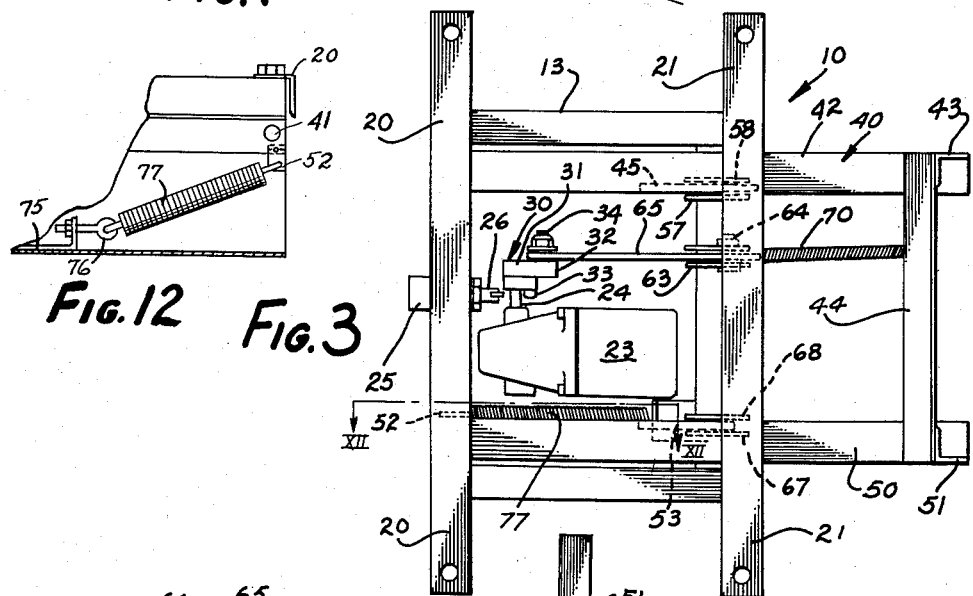
FIG. 3 is a plan view of the case stop.
FIG. 12 is a fragmentary vertical section along line XII—XII of FIG. 3.

As best shown in FIG. 12, the release arm 50 has a spring anchor 52 which is secured to the release arm 50 beneath and in back of its connection with the pivot pin 41. The spring anchor 52 receives one end of the return spring 77 which constantly urges the release arms 42 and 50 to pivot clockwise (in FIG. 12) about the pivot pin 41 and position the stop fingers in a stopping position. The release arm 42 may be provided with an anchor-and-spring arrangement disposed similarly to the spring 77 and anchor 52, or both the members may take the form of weights which tend to counterbalance the weight of the release arms 42 and 50. With such a construction a relatively light return spring can be utilized to return the release structure from the released position to the stop position.

A tie bar 44 is connected between the release arms 42 and 50 and to the stop fingers 43 and 51. The tie bar 44 reinforces both the release arms and the stop fingers. The tie bar 44 also has an aperture which acts as an anchor point for the reset spring 70 to be explained more fully hereinafter.

Although the stop fingers 43 and 51 are shown mounted on the release arms 42 and 50, it is to be understood that within the broadest aspect of this invention they may be moved inwardly and supported entirely by the tie bar 44 or the width of the tie bar 44 increased and the stop fingers positioned outwardly of the release arms 42 and 50. Such adjustment of the stop fingers 43 and 51 may be necessary under certain circumstances to adapt the case stop assembly 10 to a particular conveyor arrangement. The tops of the stop fingers 43 and 51 may also be provided with rollers which will provide easy passage of a container thereover. Such an arrangement is particularly desirable if fragile articles are being transferred by the conveyor since the ends of the stop fingers may puncture a case due to the fact that they are continuously urged to return to the stop position.

Figure 2:
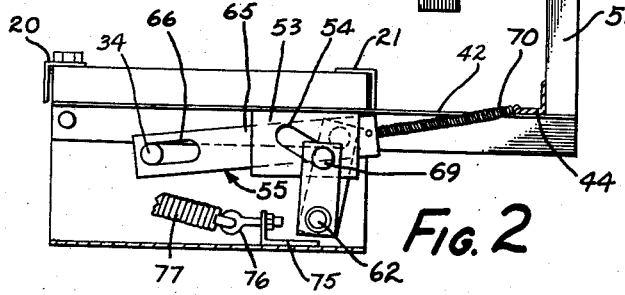
FIG. 2 is a side elevational view of the case stop.

As best shown in FIG. 2, the mounting bracket 21 acts as a stop to prevent the upward pivotal movement of the release structure. The release arms 42 and 50 engage the mounting bracket 21 and are stopped in their upward pivotal movement by coming into engagement therewith.

The release structure 50 is pivoted into the released position by the actuator mechanism 55. The actuator mechanism 55 includes a transfer rod 62 which extends between the sides 14 and 16 of the support frame and is journaled therein. The ends of the transfer rod 62 may be provided with washers and cotter pins to fix the rod to the support frame. The transfer rod 62 is positioned directly below the cam plates 45 and 53 on the release arms. Links 57 and 58 are rigidly connected to the transfer bar 62 and project upwardly on either side of the cam plate 45. The cam plate 45 is free to move between the links 57 and 58. A cam pin 59 is connected between the ends of the links 57 and 58 and passes through the cam slot 46 in the cam plate 45.

Similarly designed links 67 and 68 are rigidly fixed to the transfer bar 62 and project upwardly on either side of the cam plate 53. The ends of the links 67 and 68 are provided with a cam pin 69 which extends through the cam slot 54 and is operative therein.

Also rigidly fastened to the transfer bar 62 is a bifurcated connector element 63. The connector element 63 is positioned between the links and is aligned with the control pin 34 on the control member 30.

An actuator bar 65 has one end thereof positioned between the bifurcated connector 63 and is pivotally fastened thereto by a pin 64 which extends transversely through the connector 63 and the actuator bar 65. The other end of the actuator bar 65 is provided with an elongated lost motion slot 66 which receives the control pin 34. The end of the control pin 34 may be provided with a conventional retainer nut to prevent the actuator bar 65 from inadvertent disconnection with the control pin.

FIG. 7 shows a modified form of actuator bar which is designated generally as 85. The actuator bar 85 differs from the actuator bar 65 in that it has a slot 86 which opens upon the bottom edge of the actuator bar. The slot 86 is generally wedge-shaped and receives the control pin 34 therein. The actuator bar 85 is provided with an additional notch 87 which is positioned ahead of the slot 86. The notch 87 engages a latch 90 having a base 91 which is secured to the support frame bottom 17. This arrangement provides a means for positively locking the release structure in the released position in a manner which will be explained more fully hereinafter.

A spring shackle 75 is fastened to the support frame bottom 17 in the vicinity of the transfer rod 62. The spring shackle 75 is aligned with the anchor member 52 on release arm 50. It is a generally L-shaped member and the upturned leg thereof supports an eye bolt 76 which is connected thereto by threaded engagement. A return spring 77 is connected between the eye of the eye bolt 76 and the anchor member 52. The spring 77 constantly urges the release structure to pivot into a container stopping position. Since the eye bolt is threadedly connected with the spring shackle the tension of the spring 77 can be varied by adjusting the position of the eye bolt with respect to the spring shackle.

A reset spring 70 is connected between the actuator bar 65 and the tie bar 44 as best shown in FIG. 1. The spring 70 continuously urges the actuator mechanism 55 toward the stop fingers on the key stop assembly. The reset spring 70 functions to take up the lost motion between the actuator bar slot 66 and the control pin 34.

*Operation*

The case stop assembly 10 may be utilized with various types of conveyors; however, for purposes of illustration it is shown attached to a conventional roller type conveyor. The assembly 10 is positioned below the conveyor at a point where it is desired to stop cases or containers flowing along the conveyor. The entire assembly is positioned beneath the conveyor as best shown in FIG. 2, and the mounting brackets 20 and 21 secured to the side rails of the conveyor by conventional fasteners such as carriage bolts. When the case stop assembly is so connected to the conveyor the stop fingers 43 and 51 will project between and above adjacent rollers on the conveyor. This also is best illustrated in FIG. 2.

It will be assumed that a case is positioned on the conveyor and is abutting the stop fingers 43 and 51, and that it is desired to release the case for further movement on the conveyor. The motor 23 is energized by manually operating a switch or by other limit switch means which may be controlled by an article which has previously been released and reached a predetermined point in its travel. Upon energization of the motor the output shaft 24 thereof turns in a counter-clockwise direction and rotates the control member 30 therewith. Since the actuator bar 65 is interconnected with the control member 30 by the control pin 34 it will be acted upon by the rotation of the control member. As best shown in FIG. 2, the control pin 34 is positioned in the end of the slot 66 of the actuator bar 65. This is due to the action of the springs 70 and 77 on the actuator mechanism. Thus, the actuator bar 65 is immediately acted upon when the control member 30 is rotated. Rotation of the control member 30 will cause the actuator bar 65 to retract. Since the other end of the actuator bar 65 is fastened to the connector 63 which is in turn rigidly connected to the transfer bar 62 translation of actuator bar 65 will result in rotation of transfer bar 62. Rotation of the transfer bar 62 in turn rotates the links 57, 58, 67 and 68 resulting in the cam pins 59 and 69 moving in the cam slots 46 and 54. Since the cam pins 59 and 69 travel in a constant arc, and the cam slots 46 are at an angle thereto, the release structure 40 will be pivoted clockwise about the pivot pin 41 thus withdrawing the stop fingers 43 and 51 from the path of travel of a case on the conveyor. The case is then free to move on the conveyor.

When the motor has completed approximately one-half a revolution the actuator bar 55 has been completely retracted and the release structure 40 assumes the fully released position. At this point the control pin 34 ceases to drive the actuator bar 65 since as it continues to rotate it merely moves in the lost motion slot 66. When the motor has completed its cycle the lobe 33 on the control member 30 engages the switch actuator 26 of limit switch 25 which shuts down the motor 23. It is thus apparent that the motor is disassociated from the release structure when the release structure is in the released position.

If the case has passed over the stop fingers 43 and 51 the spring 77 which constantly urges the release structure to pivot in a counterclockwise direction will return the release structure to the case stopping position. The reset spring 70 cooperates with the return spring 77 resetting the actuator mechanism 55. The case stop assembly 10 again assumes the stopping position shown in FIG. 2.

As shown in FIG. 10, the control member 30 opens the switch 25 in the electrical circuit to de-energize the motor 24. The motor is again energized by the external switch 101. When the control member 30 has rotated a short distance the switch 25 closes keeping the motor energized until the lobe 33 engages and opens the switch again. The switch 101 is controlled by an external source such as a carton moving on a conveyor.

A different mode of operation is obtained when the control member 33a is used in place of the control member 30. The lobe 33a on the control member is designed to actuate the limit switch 25 upon each half revolution of the motor. With this arrangement the motor stops when the control pin has made a half revolution. The actuator bar 65 is then in the fully retracted position and the release structure is in the fully released position. The release structure 40 is positively held in the released position by the motor via the connection of the control pin 34 with the actuator bar 65. However, even with this arrangement the motor is entirely disassociated from the release structure. Should the motor again become inadvertently energized the cam pin 34 will merely move in the lost motion slot 66 thus preventing overload on the motor and damage to the release structure and actuator mechanism.

The control member 30a operates in an electrical circuit similar to that shown in FIG. 10 except that another switch is placed in parallel with the switch 101 to energize the motor on the half revolution.

The operation of the case stop using the control member 30b is similar to the operation with control member 30a in that the motor is de-energized every half revolution. However, the control member 30b is designed to operate with the two control switches 25a and 25b. The switches 25a and 25b are normally open when seated in the recess 33b of the control member. Thus, each time the actuator 26a or 26b enters the recess 33b, which is every half revolution, the motor 23 is de-energized. As shown in FIG. 11, the actuation of the motor is also controlled by the position of switch 111 which is in turn positioned by some external means such as an article traveling on a conveyor (not shown). The advantage of this arrangement is that the case stop can be controlled by several different means such as flow controls, photo-cells, etc. without adding expensive relays.

Still another mode of operation is provided for by the modified actuator bar 85 shown in FIG. 7. When the stop assembly 10 is in the stopping position the control pin 34 will engage the open slot 86 of the actuator bar 85. The control pin 34 abuts the end of the open slot 86 when it moves in the counterclockwise direction and retracts the actuator bar 85 operating the actuator mechanism as previously described with regard to the actuator bar 65. As the control member 30 continues to rotate, the actuator bar 85 will follow the arc traversed by the control pin 34. In so doing the notch 87 of the actuator bar 85 is engaged with the latch 90 and retained thereby. The actuator bar 85 is designed to be used with the control member 30a which shuts down the motor every half revolution as previously described. However, when the motor is de-energized it has a tendency to over run somewhat. If this occurs the release structure is not positively held in the released position since the control pin moves back in the lost motion slot when over running. To prevent this overrun of the motor it is necessary to brake the motor upon de-energization or provide some other structure to positively hold the release structure 40 in the released position. The open slot 86 in the actuator bar 85 allows the motor to over run since the control pin 34 moves out of the slot 86 as the motor continues to rotate and the actuator bar 85 is latched. With this arrangement the release structure 40 is positively locked in the released position by the latch 90, and there is no need to brake the motor. When the motor is again energized it makes another half revolution and the control pin 34 bumps the wedge surface of the open notch 86 and unlatches the actuator bar 85 from the latch 90. The actuator bar 85 will then be extended and reset by the springs 70 and 77 as the release structure is returned to the case stopping position.

The operation of the case stop using the actuator bar 85 as well as the operation of the case stop using the actuator bar 65 and the cam 33a is designed to produce a device which will positively hold the stop fingers 43 and 51 out of engagement with the case which is passing over the release structure. This is not true when the control member 30 is used since the force of the spring 77 immediately urges the release structure 40 in a clockwise direction once the control member has completed half a revolution and completely withdrawn the release structure. Thus, a small lifting force is applied to the bottom of a container as it passes over the stop fingers. This force is very light and has no adverse effect in a majority of the installations.

From the above description it can be seen that the case stop disclosed herein provides a mechanism whereby the motor is completely disassociated from the release structure when the release structure is in the release position. Embodiments of the invention provide means whereby the release structure is positively held in the released position and the motor is still disassociated from the release structure. The release structure is so designed that a motor of small horsepower and simple design may be utilized to withdraw the stop fingers from a case structure which applies several hundred pounds of line pressure thereagainst. The impact of a case hitting the stop fingers is not transferred to the motor itself due to the lost motion connection between the control member and the actuator bar. A light spring can be utilized to return the release structure to the case stopping position, and thereby prevent damage or dislodging of containers moving over the stop fingers. The overall construction of the case stop assembly is of simple design and compactly arranged thereby providing a case stop which is economical to manufacture initially and to maintain thereafter. It is versatile in that it may be used with various types of conveyors by proper positioning of the stop fingers.

While a preferred embodiment of this invention has been described, it will be understood that modifications and improvements may be made thereto. Such of these modifications and improvements as incorporate the principles of this invention are to be considered as included in the hereinafter appended claims unless these claims by their language expressely state otherwise.

We claim:

1. A case stop assembly comprising; support means; a release arm means pivotally mounted on said support means and having at least one finger projecting therefrom adapted to stop a container moving on a conveyor; power drive means; actuator means operably connected between said power drive means and said release arm means and including a lost motion connection, energization of said power means being operative on said actuator means to pivot said release out of the path of said container, said actuator means being arranged with respect to said lost motion connection to allow continued movement of said power drive means after release of said container without corresponding movement of said actuator means.

2. The assembly in claim 1 wherein biasing means biases said release arm means and finger to a position in the path of containers, and return them to said position after pivoting thereof by said actuator means and power drive means.

3. The assembly in claim 2 wherein said lost motion connection is biased to a driving relationship and returns to such relationship after passage of a released container past said finger, allowing the turn of said release arm means and finger into the path of a container.

4. A case stop assembly comprising; support means, release arms pivotally connected to one end of said support means, said arms having upwardly extending fingers adapted to stop a container moving on a conveyor, power means, actuator means including an actuator bar having a lost motion connection with said power means and with a connector secured to a pivotally mounted transfer bar, links connected to said transfer bar and to cam means connected to said release arms, energization of said power means operating said actuator means and cam means to pivot said release arms and move said fingers out of the path of travel of said container, said lost motion means allowing free movement of said power means after release of said container.

5. A case stop assembly as in claim 4 wherein said power means is controlled by limit switch means, said assembly further comprising control means associated with said power means for actuating said limit switch means to limit the extent of rotation of said power means.

6. A case stop assembly as in claim 4 wherein spring means are connected to said release arms to pivot said fingers into case stopping position.

7. A case stop assembly as in claim 4 wherin spring means are connected to said actuator means to reset said actuator means after release of said container and return of said fingers to container stopping position.

8. A case stop assembly as in claim 4 wherein resilient means are connected to said actuator means to re-set said actuator means after release of a container.

9. A case stop assembly comprising; support means, release arms pivotally secured to said support means, fingers projecting from said support means and adapted to be placed in a path of travel of a container moving on a conveyor, resilient means secured to said release arms and constantly urging said fingers into a case stopping position, power means, actuator means secured to said power means and to said release arms, said power means being operative to move said actuator means and pivot said release arms and said fingers out of the path of travel of said container to release the same, said actuator means including lost motion means disassociating said power means from said release arms when said release arms are held in the releasing position.

10. A case stop assembly comprising; support means, release arms pivotally secured to said support means, fingers projecting from said support means and adapted to be placed in the path of travel of a container moving on a conveyor, power means, switch control means connected to the output of said power means and to release arm actuator means, limit switch means operable by said switch control upon a fraction of a revolution of said switch control to terminate said power means, said release arms being pivoted to move said fingers out of the path of travel of said container when said power means is energized, said control means positively holding said release arms in released position, said control means having a lost motion connection with said actuator means whereby continued rotation of said control means by said power means is disassociated from said actuator means as long as said release arms remain in the released position.

11. A case stop assembly comprising; support means, release arms pivotally secured to said support means, fingers projecting from said support means and adapted to be placed in the path of travel of a container moving on a conveyor, power means, switch control means connected to the output of said power means and to actuator means attached to said release arms, said control means having a pin operable in an open slot in said actuator means, a notch formed in said actuator means, a latch secured to said support means and adapted to engage said notch, energization of said power means pivoting said release arms and fingers out of the path of travel of said container by said control pin operating in said open slot, said notch in said actuator means engaging said latch, and locking said release arms in the released position, said control pin upon continued rotation leaving said open slot, and a lobe on said control means for actuating a limit switch and stopping said power means upon a fraction of a revolution, said control means upon re-energization of said power means being operative to engage said actuator means and remove said notch from said latch to allow return of said release arms and finger to container stopping position under the influence of resilient means connected thereto.

12. A case stop assembly comprising; support means, release arms pivotally connected to one end of said support means, said arms having upwardly extending fingers adapted to stop a container moving on a conveyor, power means, actuator means including an actuator bar having a lost motion connection with said power means and with a connector secured to a pivotally mounted transfer bar, links connected to said transfer bar and to cam means connected to said release arms, energization of said power means operating said actuator means and cam means to pivot said release arms and move said fingers out of the path of travel of said container, said lost motion means allowing free movement of said power means after release of said container; said power means being energized through a pair of control switches; and control means associated with said power means for alternately actuating said control switches (to limit the rotation of said power means to one-half revolution), every one-half revolution of said power means.

References Cited in the file of this patent
UNITED STATES PATENTS
1,669,497    Steegmuller _____ May 15, 1928